(12) United States Patent
Bruchmann et al.

(10) Patent No.: US 8,480,243 B2
(45) Date of Patent: Jul. 9, 2013

(54) ADAPTIVE MIRROR AND METHOD FOR THE PRODUCTION THEREOF

(75) Inventors: Claudia Bruchmann, Jena (DE); Erik Beckert, Arnstadt (DE); Thomas Peschel, Jena (DE); Christoph Damm, Jena (DE)

(73) Assignees: Fraunhofer-Gesellschaft zur Foerferung der Angewandten E.V., Munich (DE); Friedrich-Schiller-Universitaet Jena, Jena (DE)

( * ) Notice: Subject to any disclaimer, the term of this patent is extended or adjusted under 35 U.S.C. 154(b) by 62 days.

(21) Appl. No.: 12/922,740

(22) PCT Filed: Mar. 17, 2009

(86) PCT No.: PCT/EP2009/001968
§ 371 (c)(1),
(2), (4) Date: Nov. 8, 2010

(87) PCT Pub. No.: WO2009/115303
PCT Pub. Date: Sep. 24, 2009

(65) Prior Publication Data
US 2011/0286075 A1   Nov. 24, 2011

(30) Foreign Application Priority Data
Mar. 17, 2008   (DE) .................. 10 2008 014 619

(51) Int. Cl.
*G02B 5/08*   (2006.01)
*G02B 7/182*   (2006.01)
(52) U.S. Cl.
USPC ........... 359/845; 359/846; 359/865; 359/872; 359/298; 359/318; 372/99; 372/107

(58) Field of Classification Search
USPC ................ 359/845, 846, 865, 872, 290–292, 359/295, 298, 318; 372/99, 107
See application file for complete search history.

(56) References Cited

U.S. PATENT DOCUMENTS

| | | | |
|---|---|---|---|
| 4,674,848 A | 6/1987 | Aldrich et al. | |
| 4,844,603 A | 7/1989 | Eitel et al. | |
| 2006/0103955 A1 | 5/2006 | Griffith et al. | |

FOREIGN PATENT DOCUMENTS

| | | |
|---|---|---|
| DE | 3628339 | 3/1987 |
| DE | 19609784 | 9/1997 |
| DE | 10052250 | 4/2002 |
| EP | 0793120 | 9/1997 |
| EP | 1227353 | 7/2002 |
| WO | 0235274 | 5/2002 |
| WO | 2006046078 | 5/2006 |

OTHER PUBLICATIONS

Ikramov et al., "Biomorph adaptive mirror" Sov. J. Quantum Electron 22, Feb. 1992, American Institute of Physics, 1992, pp. 163-166.
International Search Report and Written Opinion issued in connection with PCT Application No. PCT/EP2009/001968 on Jun. 29, 2009.
International Preliminary Report of Patentability issued in connection with International Application No. PCT/EP2009/001968 mailed on Oct. 14, 2010.

*Primary Examiner* — Evelyn A. Lester
(74) *Attorney, Agent, or Firm* — Gesmer Updegrove LLP

(57) ABSTRACT

The invention relates to an adaptive mirror based on a ceramic substrate having a corresponding reflector and piezoelectric actuators, a cooling device being integrated in the substrate. The invention likewise relates to a method for the production of such mirrors. The mirrors according to the invention are used for the modulation or deformation of a laser wavefront of high power.

21 Claims, 1 Drawing Sheet

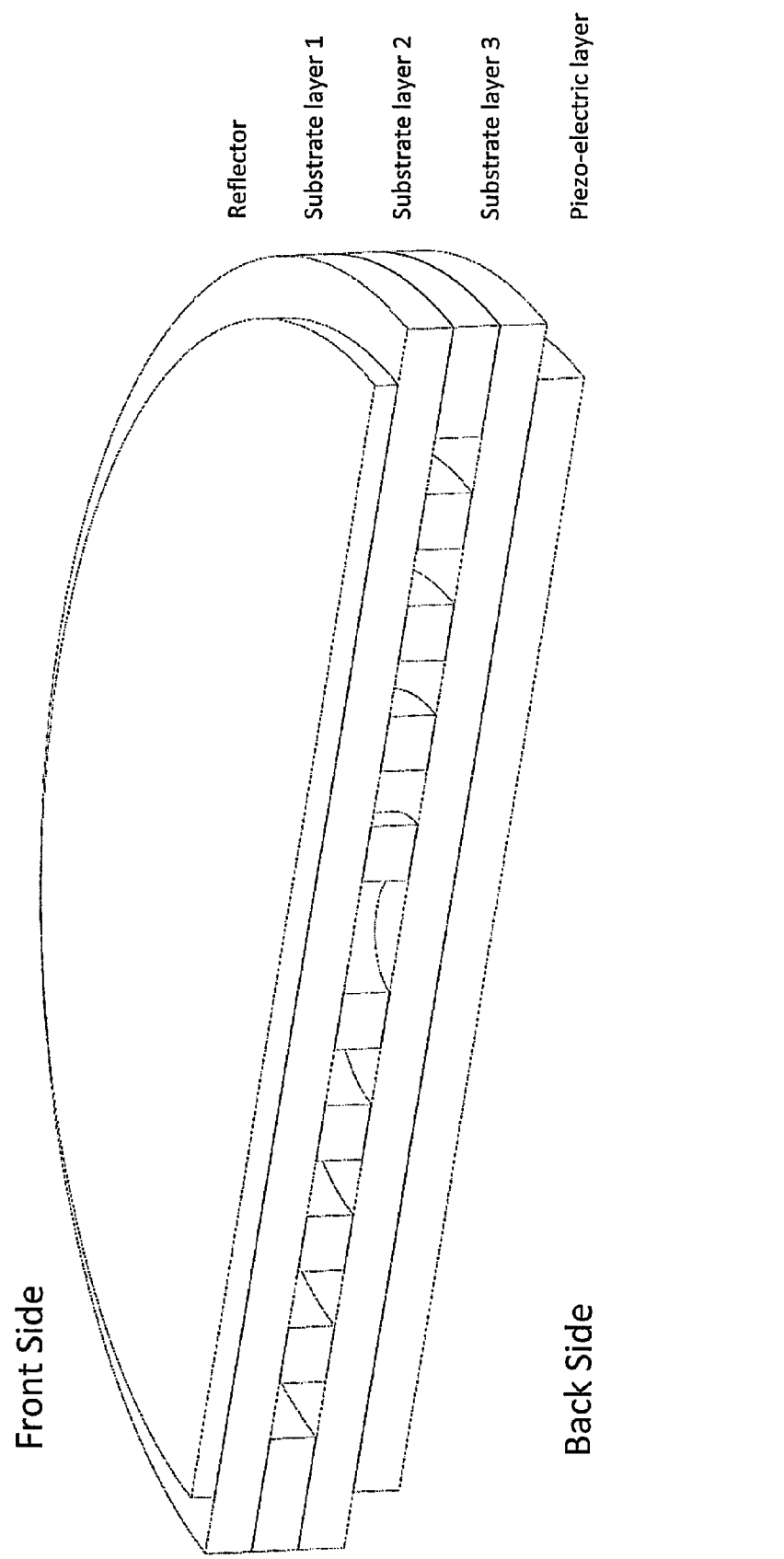

US 8,480,243 B2

ADAPTIVE MIRROR AND METHOD FOR THE PRODUCTION THEREOF

PRIORITY INFORMATION

The present application is a 371 National Phase application of International Application No. PCT/EP2009/001968, filed on Mar. 17, 2009, which claims priority to German Application No. 102008014619.6, filed on Mar. 17, 2008. Both applications are incorporated herein by reference in their entireties.

BACKGROUND OF THE INVENTION

The invention relates to an adaptive mirror based on a ceramic substrate having a corresponding reflector and piezoelectric actuators, a cooling device being integrated in the substrate. The invention likewise relates to a method for the production of such mirrors. The mirrors according to the invention are used for the modulation or deformation of a laser wavefront of high power.

One solution to the modulation of a laser wavefront with high powers with the help of an adaptive mirror was developed by A. V. Ikramov. A. V. Ikramov et al., "Bimorph adaptive mirror", Soy. J. Quantum Electron. 22(2), February 1992 describes a cooled adaptive mirror which consists of a substrate plate (copper) and a reflective disc on the substrate upper side and two piezoelectric discs on the underside.

The substrate plate has cooling channels with cooling liquid and thus functions as a cooling plate. The lower of the two piezoelectric discs is subdivided into an outer and an inner ring, whilst the upper of the two discs is subdivided into 17 parts and was contacted. Due to the cooling and the lower piezoelectric disc, the initial position of the mirror surface can be stabilised and the thermal deflection which is caused by the high power input of the reflected radiation are compensated for. The upper piezoelectric disc compensates for the deformations of the wavefront of a higher order.

The cooling has consisted to date merely of metallic substrates, such as copper or tungsten. Thus WO 02/35274 A1 describes a mirror, in particular for high power lasers, having an adjustment device for correcting the curvature of the mirror and having a cooling device which was produced by cutting methods and is intended to be situated close to the heat introduction. The supply and discharge line of the cooling medium is effected via the webs of the mirror suspension. The actuators act either at points or over the surface, but in any case perpendicular to the mirror surface. The industrial right US 000004674848 A was also conceived for use as laser mirror and has piezoelectric stacked actuators which act perpendicular to the mirror surface.

EP 07 93 120 A1 describes an adaptive bimorph mirror for use in laser systems and in astronomy telescopes. The mirror substrate and the mirror frame are manufactured from one piece, the height of the suspension of the mirror being thinned close to the fixing and thus having a predetermined breaking point which can also in addition be structured. The mirror frame can function as heat sink and thus cool the mirror membrane.

These systems known from the state of the art involve the disadvantage that high manufacturing complexity is associated with the use of metallic substrates. Thus, metals, in particular copper, in fact have good thermal conductivity but they also have a high thermal inherent expansion. In addition, it is disadvantageous that the effect of the piezoelectric actuators can be weakened by the great substrate height.

SUMMARY OF THE INVENTION

Starting herefrom, it was the object of the present invention to provide adaptive mirrors which overcome the disadvantages of the state of the art and display good suitability with respect to modulation of laser wavefronts. At the same time, mirrors of this type are intended to be easily producible.

This object is achieved by the adaptive mirror having the features of claim 1 and the method for the production thereof having the features of claim 17. The further dependent claims reveal advantageous developments. Claim 22 mentions a use according to the invention.

BRIEF DESCRIPTION OF THE DRAWING

FIG. 1 is a schematic block diagram of an adaptive mirror in accordance with an exemplary embodiment of the invention.

DETAILED DESCRIPTION OF THE INVENTION

According to the invention, an adaptive mirror is provided, which has a ceramic substrate, at least one reflector which is disposed on the front-side of the substrate and is structured in optical quality and also at least one piezoelectric actuator which is disposed on the rear-side of the substrate. The adaptive mirror according to the invention thereby has at least one cooling device which is integrated in the substrate or is disposed on one of the surfaces of the substrate. In the latter case, the cooling device or cooling structure can be disposed then between the substrate and the reflector and/or between the substrate and piezoelectric actuators.

Preferably, the substrate material has a maximum thermal expansion of $2*10^{-6}$ to $10*10^{-6}$K.

Preferably, a low temperature co-fired ceramic (LTCC) is used as substrate material. When using LTCC materials, multilayer structures which can be manufactured by economical batch processes are provided. Furthermore, LTCC offers the advantage that the mirrors can be constructed monolithically.

Preferably, different glass ceramics are used, such as for example low temperature co-fired ceramics (LTCC), aluminium oxide ceramics ($Al_2O_3$), aluminium nitride ceramics (AlN), zirconium oxide ($ZrO_2$), cordierite materials and variants based thereon with low thermal expansion coefficients, titanium silicate glass, such as for example ULE and further glass ceramics with very low thermal expansion coefficients, such as for example Clearceram-Z by the company Ohara, Zerodur by the company Schott AG and/or Astrositol. With respect to the composition of Clearceram-Z, reference is made to U.S. Pat. No. 5,591,682 and the disclosure content thereof in this respect is adopted. There are understood by low temperature co-fired ceramics, for example green foils consisting of $Al_2O_3$ with a glass proportion up to 50% and organic binders which are laminated on each other and subsequently sintered. There are possible as cordierite materials, low CTE Cordierite™. Based thereon, magnesium aluminium silicates with the simplified approximation of the composition of pure ceramic cordierite, which contains defined proportions of MgO, $Al_2O_3$ and $SiO_2$, can be used. The proportions can be divided for example into 14% MgO, 35% $Al_2O_3$ and 51% $SiO_2$.

Likewise, DCB substrates (direct copper bonded) can be used as substrate layer. Involved thereby are materials which are already metallised on their front-side and on their rear-side. Thus, a copper layer can be bonded for example on an aluminium oxide ceramic and/or an aluminium nitride ceramic. Such products can be obtained from the company Electrovac ceramic GmbH. The metallisation can serve later as mirror layer and/or as electrode for the actuators.

Preferably, the piezoelectric actuator consists of a thick layer which can be applied as piezoelectric single- or multi-layer. Likewise, it is possible that one or more piezoelectric discs are mounted on the substrate as actuators. The metallisation on the front-side is a thick layer which was applied by means of screen printing, via chemical metal deposition or galvanic deposition. The applied metal can be for example, but not exclusively, copper, nickel, silver or alloys thereof.

In the case of the piezoelectric actuators according to the invention, the mechanical force does not act parallel to the applied field and hence longitudinally but rather transversely. This means that the actuators act along the membrane plane.

Preferably, there is disposed between the piezoelectric actuator and the substrate, at least one LTCC layer which has a structuring for transporting a cooling liquid. This can be achieved for example such that a structured and a non-structured LTCC layer is inserted between the piezoelectric actuator and the substrate. The volume remaining due to the structuring can be used for example for the transport of a cooling medium or, if a cooling medium is transported, serve as additional thermal barrier. In the second case, for example cylindrical cavities can be designed with the height of an LTCC layer. For this purpose, holes with a diameter of 150 μm are stamped into the foil in the green state and sintered together with the upper and lower cover made of LTCC. Subsequently, metallisations are applied on the front- and rear-side, for example via screen printing processes. The metallisation on the rear-side thereby serves as basic electrode for the subsequently imprinted PZT ceramic and the metallisation on the front-side either as starter layer for the chemical deposition of metals (for example Cu or NiP) or alloys thereof, or a metallisation is screen printed. For this purpose, for example copper, silver or gold can be used.

The cooling channels can thereby be open or also connected to a closed cooling circulation. Likewise, it is possible that closed tubes or cavities in the form of heat pipes are present as cooling structures.

If in contrast a cooling medium, preferably a cooling liquid or a cooling gas, is transported, the central layer LTCC is stamped such that a channel system is formed by the combination with the upper and lower cover, through which channel system the cooling medium flows or streams. The channel system can thereby be configured in the form of a double spiral or in the form of a star.

A further variant according to the invention provides that a boring for heat dissipation, so-called thermal vias, are introduced into the substrate, as a result of which the temperature on the substrate front-side and rear-side can be transported away, as a result of which the temperature for example can be transported from the substrate front-side to the substrate rear-side (FIG. 1A), copper for example has a heat conductivity of 391 W/(mW) and nickel-phosphorus alloys have a heat conductivity of 40 to 100 W/(mK). As a result, the temperature is transported away more rapidly on the reflective front-side. The heat-conducting layer on the front-side can thereby also serve as reflector and it can serve, on the rear-side, as lower electrode.

The thermal vias preferably have a diameter of 100 to 175 μm and are disposed at a spacing relative to each other of 100 to 200 μm. These then have a thermal conductivity of approx. 20 (W/mK). The diameter of the thermal vias can however also be increased in special cases to 260 to 440 μm.

Another embodiment according to the invention provides that a thermally conductive layer is disposed between substrate and piezoelectric actuator and/or between substrate and reflector layer, which thermally conductive layer is in communication with a heat sink. This thermally conductive layer can for example consist of copper, molybdenum or tungsten.

In a further embodiment variant, the metallisation of the substrate front-side is connected to the cooling medium via thermal vias and thus ensures more rapid transport away of the heat. The thermal vias can also connect the reflective front-side (for example copper metallisation) to an inner metallisation on a lower LTCC layer and thus transport the heat away more rapidly. Further metallisations are applied on the front- and rear-side of the multilayer structure via screen printing processes. The metallisation on the rear-side thereby serves as basic electrode for the subsequently imprinted PZT ceramic and the metallisation on the rear-side as basic electrode for the subsequently imprinted PZT ceramic and the metallisation on the front-side either as starter layer for the chemical deposition of metals (for example Cu or NiP) or alloys thereof, or a metallisation is screen printed. For this purpose, for example copper, nickel-phosphorus, silver or gold can be used.

It is further preferred that the piezoelectric actuators have a first electrode on their freely accessible surfaces. In addition, a second electrode, so-called basic electrode, is situated on the surface orientated towards the substrate, said second electrode preferably having a planar configuration and being able thus to effect an electrical connection of the actuators.

Preferably, a metallic starter layer is deposited on the front-side of the substrate, on which starter layer a thick layer then grows galvanically or chemically. The deposition temperature is thereby preferably in the range of 20 to 100° C. and leads, during cooling of the layer at room temperature, to a thermally conditioned concave deformation. Before this layer is coated with a highly reflective multilayer, the galvanic layer is structured by means of diamond machining in optical quality. The structuring is thereby coordinated such that the deformation of the adaptive mirror, which occurs because of the expected power input, is precompensated for by the machined surface geometry. If power impinges on the mirror and is absorbed, the mirror is deformed such that the mirror surface becomes planar. The piezoelectric actuators can now compensate for the deformations of the wavefront of a higher order.

The substrate can be constructed preferably as a multilayer structure. A large number of possibilities for functional integration results herefrom. Thus, for example mechanical mirror frames made of the substrate material can be generated via a frictional connection between the partial membranes. Likewise, it is possible to integrate electrical supply units and thermomechanical structures via a frictional connection between the individual layers in the substrate. For the integration of further functions, the individual layers of the LTCC substrate are structured and connected frictionally.

According to the invention, a method for the production of an adaptive mirror, as was described previously, is likewise provided, in which, on the rear-side of the ceramic substrate, at least one piezoelectric actuator is disposed and connected frictionally and the actuators are contacted electrically. A deposition of at least one reflector layer is effected on the front-side of the ceramic substrate, at least one cooling device being integrated in the substrate or disposed on one of the surfaces of the substrate.

Preferably, before the deposition of the at least one reflector layer on the front-side of the ceramic substrate, firstly a metallic starter layer is deposited on which then a thick layer with a thickness in the range of 30 to 100 μm grows galvanically or chemically.

This galvanically or chemically deposited layer is structured by diamond machining preferably in optical quality.

In a further embodiment variant, a metallic layer having a thickness in the range of 15 to 100 μm is deposited on the front-side via repeated screen printing.

The metallisation on the front- and rear-side can be applied either in the green state or in the sintered state of the ceramic substrate, for example by screen printing. The metallisations can thereby consist of for example, but not exclusively, gold, silver, copper and alloys hereof or comprise these.

A further method for applying metallisations is bonding.

The metallisation between two LTCC layers has, in the green state, preferably a layer thickness of approx. 10 μm, whilst the metallisations on the front- and rear-side can also have significantly higher layer thicknesses, e.g. up to approx. 100 μm. Metallisations on the front-side are machined subsequently preferably mechanically, e.g. by grinding or turning, in order to equalise the unevenness of the substrates.

The thermal vias are preferably stamped and preferably filled with silver, palladium, gold or alloys hereof and placed over the metallised LTCC substrate and sintered. Furthermore, additional LTCC layers can be added.

The cooling channels are preferably manufactured by being stamped out of an LTCC layer and being sintered with respectively one cover layer above and below this layer. The consequently formed cavity is connected to a cooling medium and hence increases the heat conductivity for the multilayer structure.

The described adaptive mirror is used for modulation or deformation of laser wavefronts with high power, e.g. a high power laser.

What is claimed is:

1. An adaptive mirror comprising a ceramic substrate, at least one reflector which is disposed on the front-side of the substrate and also at least one piezoelectric actuator which is disposed on the rear-side of the substrate, at least one cooling device being integrated in the substrate or disposed on one of the surfaces of the substrate and a structured LTCC layer which has a structuring for transporting a cooling liquid and a non-structured LTCC layer is disposed between the piezoelectric actuator and the substrate.

2. The adaptive mirror according to claim 1, wherein the substrate material has a maximum thermal expansion of $2*10^{-6}$ to $10*10^{-6}$/K.

3. The adaptive mirror according to claim 1, wherein the substrate material comprises glass ceramics, LTCC ceramics, aluminium oxide ceramic ($Al_2O_3$), aluminium nitride ceramic (AlN), green foils made of $Al_2O_3$ powder and organic binders, zirconium oxide ($ZrO_2$), cordierite materials, Clearceram-Z or Astrosital, titanium silicate glass and lithium-aluminosilicate glass ceramics or consists of one or more of these materials.

4. The adaptive mirror according to claim 3, wherein the piezoelectric actuator consists of at least one thick layer having a thickness in the range of 15 to 150 μm or at least one piezoelectric disc.

5. The adaptive mirror according to claim 1, wherein the mirror has cooling channels as cooling device which are connected to a closed cooling medium circulation.

6. The adaptive mirror according to claim 1, wherein the cooling medium is a cooling liquid or a cooling gas.

7. The adaptive mirror according to claim 1, wherein the substrate has at least one boring for heat dissipation.

8. The adaptive mirror according to claim 1, wherein there is disposed between substrate and piezoelectric actuator and/or between substrate and reflector layer, a thermally conductive layer in communication with a heat sink.

9. The adaptive mirror according to claim 1, wherein the piezoelectric actuators have, on their freely accessibly surfaces, a first electrode and, on the surface orientated towards the substrate, a second electrode which preferably has a planar configuration and thus effects an electrical connection of the actuators.

10. The adaptive mirror according to claim 1, wherein the reflector consists of a reflective multilayer.

11. The adaptive mirror according to claim 1, wherein the reflector consists of a reflective metal mirror.

12. The adaptive mirror according to claim 1, wherein the reflector consists of a reflective metal mirror with an additional multilayer which increases the degree of reflection and lowers the degree of absorption.

13. The adaptive mirror according to claim 1, wherein the reflector consists of a reflective metal mirror with an additional dielectric layer which increases the degree of reflection and lowers the degree of absorption.

14. The adaptive mirror according to claim 1, wherein there is disposed between substrate and reflector, a metallic starter layer deposited on the substrate and a galvanically or chemically deposited thick layer having a thickness in the range of 5 to 100 μm.

15. The adaptive mirror according to claim 14, wherein the galvanically deposited thick layer is structured by means of diamond machining in optical quality.

16. A method for the production of an adaptive mirror according to claim 1, in which, on the rear-side of the ceramic substrate, at least one piezoelectric actuator is disposed and connected frictionally, the actuators are contacted electrically and, on the front-side of the ceramic substrate, a deposition of at least one reflector layer is effected, at least one cooling device being integrated in the substrate and/or disposed on one of the surfaces of the substrate.

17. The method according to claim 16, wherein, before deposition of the at least one reflector layer on the front-side of the ceramic substrate, firstly a metallic starter layer is deposited and, on the metallic starter layer, a thick layer having a thickness in the range of 5 to 100 μm is grown galvanically or chemically.

18. The method according to claim 17, wherein the galvanic thick layer is structured by diamond machining in optical quality.

19. The method according to claim 16, wherein the deposition is effected at temperatures of 20 to 100° C. and, during cooling of the mirror at room temperature, a concave deformation of the mirror occurs.

20. The method according to claim 16, wherein the ceramic substrate is formed from a plurality of layers, mechanical mirror frames and/or electronic supply units being integrated between the layers.

21. The adaptive mirror according to claim 1, wherein said mirror is utilized for the modulation of a laser wavefront of a high power laser.

* * * * *

UNITED STATES PATENT AND TRADEMARK OFFICE
CERTIFICATE OF CORRECTION

PATENT NO. : 8,480,243 B2
APPLICATION NO. : 12/922740
DATED : July 9, 2013
INVENTOR(S) : Bruchmann et al.

It is certified that error appears in the above-identified patent and that said Letters Patent is hereby corrected as shown below:

On the Title Page:

In Item (73) Assignees, please correct the name of the first assignee to:

FRAUNHOFER-GESELLSCHAFT ZUR FOERDERUNG DER ANGEWANDTEN E.V.

Signed and Sealed this
Twenty-seventh Day of August, 2013

Teresa Stanek Rea
*Acting Director of the United States Patent and Trademark Office*